T. W. WELSH.
Vacuum Brake-Pipe Couplings.

No. 221,987.  Patented Nov. 25, 1879.

Witnesses  
R. J. Whittlesey  
O. L. Parker

Inventor Thomas W. Welsh.  
By Attorney George H. Christy

UNITED STATES PATENT OFFICE.

THOMAS W. WELSH, OF PITTSBURG, PENNSYLVANIA, ASSIGNOR TO THE WESTINGHOUSE AIR BRAKE COMPANY, OF SAME PLACE.

IMPROVEMENT IN VACUUM-BRAKE-PIPE COUPLINGS.

Specification forming part of Letters Patent No. 221,987, dated November 25, 1879; application filed August 29, 1879.

*To all whom it may concern:*

Be it known that I, THOMAS W. WELSH, of Pittsburg, county of Allegheny, State of Pennsylvania, have invented or discovered a new and useful Improvement in Vacuum - Brake-Pipe Couplings; and I do hereby declare the following to be a full, clear, concise, and exact description thereof, reference being had to the accompanying drawings, making a part of this specification, in which—like letters indicating like parts—

Figure 1:
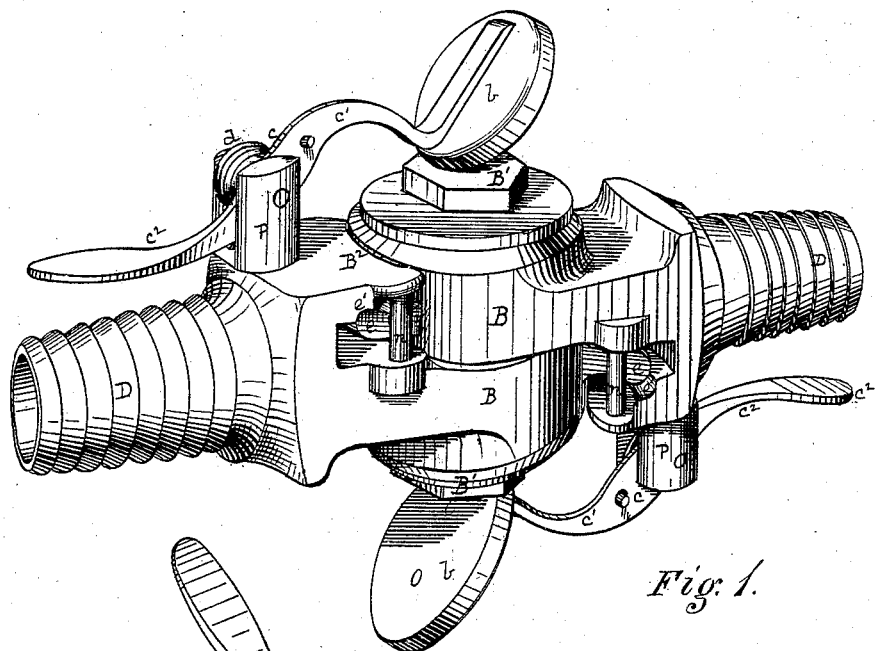
Figure 2:
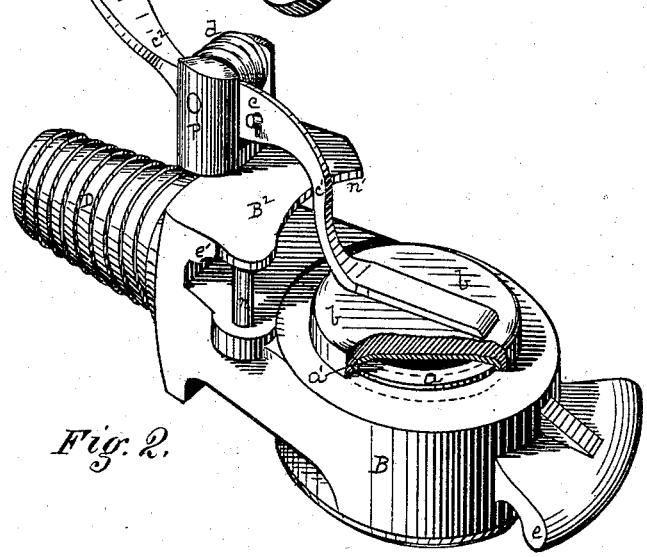

Figure 1 is a view in perspective of a pair of couplings illustrative of my improvement; and Fig. 2 is a like view of one half of the coupling, but with a portion of the valve broken away in order to show the packing-ring.

My present invention consists in certain improvements in the coupling described in United States Patent No. 157,951, granted to George Westinghouse, Jr., December 22, 1874, whereby it is adapted, without material change in its general structure, to use as a coupling for vacuum-brake pipes.

The general construction of the main part or body of each half remains the same as in said patent. The end box, B, is the same, and is closed on one side by a like cap, B', though the latter is preferably flattened somewhat on top, or made less high than is represented in said patent.

A like packing-ring, $a$, is inserted and held in like manner in the port-opening of each half-coupling, and like curved hooks $e$ and counter-curved hooks $e'$ are also provided; but I consider the pressure-frame and spring described in said patent as unnecessary, though they may be used, if desired. The usual thimbles D are also provided, and the through communicating - ports are the same, as also are the stop-posts $n$.

In this coupling, as shown in the drawings, it will be observed that the plane of junction of the two half-couplings is in the line with the general direction of the flow of the air, or, in other words, passes through and along the axial line of the end connection, or substantially parallel therewith.

While slight variations may be made in this respect, I do not propose, in so far as relates to the present invention, to make any substantial departure therefrom; but on a coupling thus constructed I mount back of the flange $B^2$, which carries the counter-hook $e'$, a post, P, and in the latter pivot a bent lever, $c$, having a downward-curved bend, $c'$, at its forward end, such that when the valve is seated the lever will clear the flange $B^2$ and be upwardly curved at its outer end, as at $c^2$, so that when the valve is seated the operator may be able to catch and depress the lever end $c^2$ with a finger or thumb of the same hand with which he grasps the coupling or pipe when about to make the connection, and also so that such lever end $c^2$ may be thus so far depressed that the valve will clear the cap B' in coupling, as shown in Fig. 1.

To the outer end of the lever the valve $b$ is attached, so that when seated, as in Fig. 2, it will rest neatly on and close the port-opening through the packing-ring $a$; and the seating-face of the valve may be packed with india-rubber or other suitable material, if so desired, so as to secure a tight joint, even if the pressure of the valve on the ring $a$ should force the latter down flush with the surrounding face of the box B. Such a packing-ring is shown at $a'$, Fig. 2.

Spring-pressure to hold the valve to its seat may be applied by means of any suitable spring, one of the well-known spiral form being shown at $d$.

The half-couplings thus described are duplicates of each other, so as to be interchangeable at pleasure, and so that any two may be coupled together, and while having holding capacity sufficient for ordinary use they are automatically detachable under unusual longitudinal strain.

I claim herein as my invention—

In a coupling the junction-faces of which are in a plane passing along the axial line of the end connections, or substantially parallel therewith, a flap-valve, $b$, held to its seat, when not forcibly raised, by spring-pressure, in combination with yielding packing - rings $a$, unyielding curved hooks and counter-hooks $e$ $e'$, and stop-posts $n$, substantially as set forth.

In testimony whereof I have hereunto set my hand.

THOMAS W. WELSH.

Witnesses:
R. H. WHITTLESEY,
GEORGE H. CHRISTY.